(12) United States Patent
Thenthiruperai et al.

(10) Patent No.: US 8,335,543 B1
(45) Date of Patent: Dec. 18, 2012

(54) CONTENT MANAGEMENT IN WIRELESS DEVICES WITH SAVING OF CONTENT SETTINGS

(75) Inventors: Balaji S. Thenthiruperai, Overland Park, KS (US); Kevin Hunter, Olathe, KS (US); Brian Landers, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 448 days.

(21) Appl. No.: 11/586,452

(22) Filed: Oct. 24, 2006

(51) Int. Cl.
*H04M 1/00* (2006.01)
*H04M 3/00* (2006.01)

(52) U.S. Cl. .................. 455/567; 455/418; 379/373.03

(58) Field of Classification Search .............. 455/414.1; 707/205; 709/217, 219, 224; 463/25, 29; 705/26; 725/22, 23, 46, 62; 713/200; 379/373.01, 379/373.03, 373.05
See application file for complete search history.

(56) References Cited

U.S. PATENT DOCUMENTS

| | | | |
|---|---|---|---|
| 6,754,894 B1 * | 6/2004 | Costello et al. ............... | 717/169 |
| 2002/0002541 A1 * | 1/2002 | Williams ....................... | 705/51 |
| 2002/0122076 A1 | 9/2002 | Nakaki .......................... | 345/847 |
| 2004/0034794 A1 * | 2/2004 | Mayer et al. ................... | 713/200 |
| 2005/0044191 A1 | 2/2005 | Kamada et al. ................ | 709/223 |
| 2005/0102385 A1 | 5/2005 | Muhonen et al. .............. | 709/223 |
| 2005/0129042 A1 | 6/2005 | Muhonen et al. .............. | 370/412 |
| 2005/0193125 A1 * | 9/2005 | Philyaw ......................... | 709/228 |
| 2005/0239494 A1 | 10/2005 | Klassen et al. .............. | 455/550.1 |
| 2006/0052091 A1 * | 3/2006 | Onyon et al. .................. | 455/415 |
| 2006/0068911 A1 * | 3/2006 | Pirich et al. ..................... | 463/40 |
| 2006/0165060 A1 * | 7/2006 | Dua ............................... | 370/352 |

* cited by examiner

*Primary Examiner* — George Eng
*Assistant Examiner* — Nizar Sivji

(57) ABSTRACT

A method of managing media content such as games, ring tones, screen savers and other media content stored in a wireless device, e.g. cellular phone, is disclosed. The method comprises the steps of storing media content in a memory in the wireless device in a content file, separately storing settings for the media content in the memory in a settings file, and deleting the content file while simultaneously preserving storage of the settings file. The content file may be deleted in response to user action or in response to a timer expiring. If the user attempts to access deleted content, they are prompted to repurchase the content. If the content is repurchased, the saved content settings may be re-applied automatically to the repurchased content.

8 Claims, 4 Drawing Sheets

CONTENT MANAGEMENT IN WIRELESS DEVICES WITH SAVING OF CONTENT SETTINGS

BACKGROUND

A. Field

This invention relates generally to methods of managing media content loaded onto a wireless device such as cellular telephone or personal digital assistant. More particularly, the invention relates to a method of managing media content by storing media content files separate from settings files for the content, whereby the content itself can be deleted while preserving in memory the settings.

B. Related Art

Over the last few years, wireless devices such as cellular telephones and personal digital assistants have been improved with faster processors and larger memories, whereby they can provide additional functionality for users beyond making and receiving telephone calls. For example, such devices may support Internet access, sending and receiving e-mail, playing interactive games, customizing ring tones, and other features. Despite these upgrades, a need still exists to manage limited storage space on mobile devices in an efficient manner, while simultaneously providing a good user experience. Given the fact that limited storage space still can be an issue, a user may delete some memory-intensive media content from the device, such as a game that is not being used, photo, video or multimedia screensaver, ring tone, etc., in order to save space in the device's main memory. Later, the user may again download the same content. However, in accordance with prior art techniques settings that were in effect for the content when it previously existed on the device are lost, because it was deleted when the content was deleted.

This disclosure provides for methods and apparatus for more efficiently managing media content on a wireless device while still preserving a good user experience by saving content settings, so that in the event that the user reacquires previously deleted content the savings can be automatically reapplied to the content.

SUMMARY

In a first aspect, a method is provided for managing media content stored in a wireless device, comprising the steps of storing media content in a memory in the wireless device in a content file, separately storing settings for the media content in the memory in a settings file, and deleting the content file while simultaneously preserving storage of the settings file. The act of deletion can be performed by the user, e.g., when they decide that they are not longer interested in some media content. In other embodiments, the content file is automatically deleted upon passage of an amount of time after the content was initially stored in the wireless device. For example, when content such as a ring tone is downloaded to the device, the ring tone content is associated with an expiration date of 60 days, after which the content is deleted.

After content is deleted, the user may decide to reacquire the content. In that event, the method may further comprise the steps of reacquiring the media content from a network content server, and applying the settings in the preserved settings file to the reacquired media content. The settings file may contain a pointer to the content file, or vice versa, such that the media content can refer to a separate location in memory where settings for the content file are stored.

The media content that this invention can be implemented with varies widely and generally pertains to any content for which user-customizable settings associated with the content may exist, as a feature of the content. Examples are content include ring tones (where the user can associate a particular ring tone to one or more calling parties), screen saver content in the form of pictures or video, user interface themes or skins (where the user can customize the look and feel of the entire user interface), and games (where the user can configure player preferences and game statistics, such as high score, etc. are stored).

The point of saving the settings file separately from the actual media content file and preserving the settings while deleting the content allows valuable storage space to be opened up on the device memory for media content that is not currently used. However, if the user reacquires the content, the settings can be automatically and immediately applied to the content. The user does not have to reconfigure the content in order to restore the settings to where they were when the content was deleted.

In another aspect an improvement in a wireless device storing a media content file in memory on the device is provided, the improvement comprising also providing in the memory a file storing settings for the media content file separate from the media content file, wherein the media content file may be deleted from the memory but the settings file may be simultaneously preserved in the memory. In one embodiment the content is associated with an expiration timer and wherein the content file is automatically deleted in accordance with the expiration timer.

In one further embodiment, the wireless device further comprises an application providing for user selection of media content files and wherein the application is configured such that, in the event that the user attempts to select a media content file which has been deleted from memory, the application facilitates the user re-acquiring the content from a network content server. For example the user is provided with a URL of a network server which currently offers such content for download (either free or for purchase). The user may navigate through a series of prompts and obtain the content. As another alternative, the user may be prompted to press one or more buttons on a sound-producing smart card (e.g., "Ki-Bi" card) which causes the wireless device to automatically connects to the network content server and download the content. The saved settings are then reapplied to the reacquired content.

In still another aspect, a media content management apparatus for a wireless device is disclosed comprising a machine readable memory storing program instructions for managing media content stored on the wireless device, wherein the program instructions comprise a routine deleting media content files while simultaneously preserving settings files for deleted media content files. In one embodiment, the program instructions delete the media content file in accordance with an expiration timer associated with the media content file. For example, content is resident on the device for 60 or 90 days and is automatically deleted after such period of time elapses. As another example, the content may be deleted if the user has not invoked or used the content is some period such as 60 days. The program instructions may further comprise instructions for prompting the user of the wireless device to reacquire media content that has been deleted, for example in the situation where the user attempts to invoke content that was been deleted in accordance with the program instructions. In the event that the user reacquires the media content, the program instructions associate the saved settings file with the reacquired media content.

In one configuration, in the event that the user reacquires the media content, the program instructions prompt the user to decide whether to associate the saved settings file with the reacquired media content.

In yet another configuration, in the event that the user declines to reacquire media content which has been deleted after having been prompted to reacquire it, the program instructions delete the settings file from the memory.

DETAILED DESCRIPTION

Overview

Figure 1:
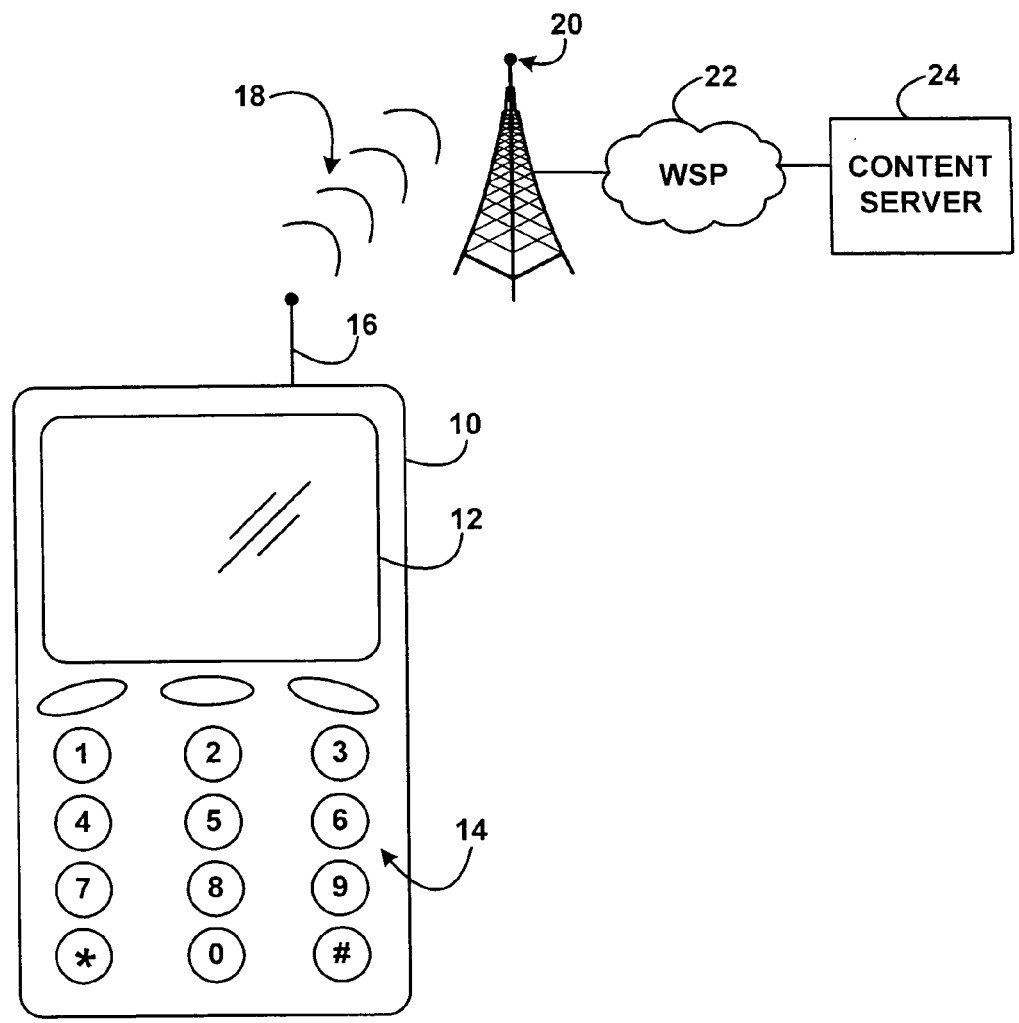
FIG. 1 is an illustration of a wireless device in the form of a cellular telephone or personal digital assistant that obtains content (e.g., ring tones, screen savers, games or other digital media content) from a content server connected to a wireless service provider network. The details of the network infrastructure are conventional, not important, and known in the art and therefore are omitted from the figure.

This disclosure provides for a more efficient method of managing media content on a wireless device than proposed in the prior art. The methods are performed by means of a media content management application, the functions of which are described herein. In particular, aspects of the disclosed embodiments provide for enhanced memory management in a wireless device by deleting media content but simultaneously preserving in memory the content-settings, which generally are much less memory intensive than the media content itself. To manage/preserve memory on a handheld wireless device, media content such as a ring tone, game, screensaver (e.g., user-interface theme), or other media content may be automatically deleted upon its designated expiration, for example as dictated by an expiration timer associated with the content. The content may also be manually deleted for example by the user in an attempt to gain more memory storage space. However, the device retains and preserves settings for the deleted content in a separate settings file, for example caller-correlations for the ring tone, player preferences or level-attained for a game, properties of the screensaver, and so forth. While the media content is deleted, the settings file is separately preserved and saved in memory.

In one possible configuration, the device may retain an indication of the deleted content in a content list (e.g., in a ring tone list, a game list, etc.), the content marked or flagged as expired. When a user then seeks to re-access previously deleted content, the content-management application may notify the user that the content expired and may responsively prompt the user to reacquire (e.g., re-purchase) the content. If the user elects to reacquire the content, the content management application re-associates the saved settings with the reacquired content, e.g., by the use of pointers, thereby preventing the user from having to go through the tedious task of reestablishing all their settings for the content. Thus, the present disclosure provides for a method for deleting content, e.g., after the expiration of a timer, after a certain amount of time elapses of non-use, or in response to specific user action, while simultaneously preserving settings for the content in the event that the user later reacquires the content. If the user attempts to access expired content, the user is prompted to reacquire the content. If the user does not reacquire the content in response to the prompt (for whatever reason, e.g., change of mind), the settings file may be deleted in one possible configuration.

First Example

A user downloads a ring tone file (e.g., .WAV file) from a network content server to their wireless device and applies a setting for the ring tone file to set it to ring when caller X calls. The ring tone may have a 90-day expiration period. In accordance with prior art teachings, that ring tone would be deleted from the device upon expiration of the 90 day period, along with the settings (correlating the ring tone file to caller X). Alternatively, the user may delete it from the device manually, since it may no longer work after 90 days or they decide they do not like it any more. With the invention, after 90 days, the ring tone media content file (e.g., .WAV, .AAC+, or other file) defining the ring tone—which takes up the bulk of the memory space of the ring tone—will be deleted from the wireless device main memory. However, the device will separately save in memory the settings for the ring tone file in a separate settings file which is preserved (saved) even when the ring tone file is deleted. In one possible configuration, the device will flag the ring tone to indicate that it is expired, i.e., not there anymore. The expiration flag can cause the content management application to prompt the user to repurchase the ring tone if they attempt to access it later on. If the user then repurchases or otherwise subsequently obtains the same ring tone, the saved settings are applied to content (e.g., by use of pointers) and such settings will then be in effect once again.

Second Example

A user downloads a media file in the form of a game file for playing interactive games using the wireless device. The game file is stored in memory. The player establishes settings for the game, such as player preferences. The game application may also establish other settings, such as the highest score achieved to date, the top three scores, average score, game settings invoked by the user, etc. These game settings are stored in a separate games settings file, e.g., as a .DAT data file. The game is downloaded with a 60 day period upon which the game expires. The content management application monitors the expiration time and when the 60 days have elapsed the game file is deleted from the memory. Advantageously, the invention can save on the order of 0.5 megabytes by deleting a game. However, the settings file (stored in a separate .DAT file) is saved. The settings file is stored in case the game is again loaded on the device. When the user tries to play the game after it has been deleted, the content management application may prompt the user to repurchase the game, and if so, the game settings are reapplied to the new game. If the user elects not to re-purchase the game, the settings file is also deleted.

The above explanations are provided by way of example only and persons skilled in the art will appreciate the methods may be performed in similar fashion for other media content that is associated with settings, such as screen savers, user interface themes, and so forth.

Turning now to the drawings, FIG. 1 is an illustration of a wireless device 10 such as a cellular telephone or personal digital assistant (conventional) which includes a user interface display 12 and keypad 14. The device 10 includes an antenna 16 for engaging in wireless communications with a cellular telephone network infrastructure, the details of which are not important, such as a CDMA base station antenna 20, wireless service provider network 22, and a content server 24. The content server 24 is a source for media content to be delivered to the device 10. Such content may take the form of a ring tone, a game, a screen saver, a user interface theme or "skin" or other media content. Such content may be purchased for a fee which is charged to the wireless device user's monthly account, credit card, debit from pre-paid calling card, or other. The content may also be obtained from the content server 24 using a smart card such as a so-called "Ki-Bi" card, which plays a tone pattern which is detected by a microphone in the device 10 and which prompts the device to dial in via the WSP network 22 to a content server and download content. The mechanisms for download of content from a network sever 24 are known in the art and therefore a detailed description is omitted for the sake of brevity. Suffice it to say that the methods by which media content is downloaded to the device 10 are not particularly pertinent and may be by any method now known or later devised.

Figure 2:
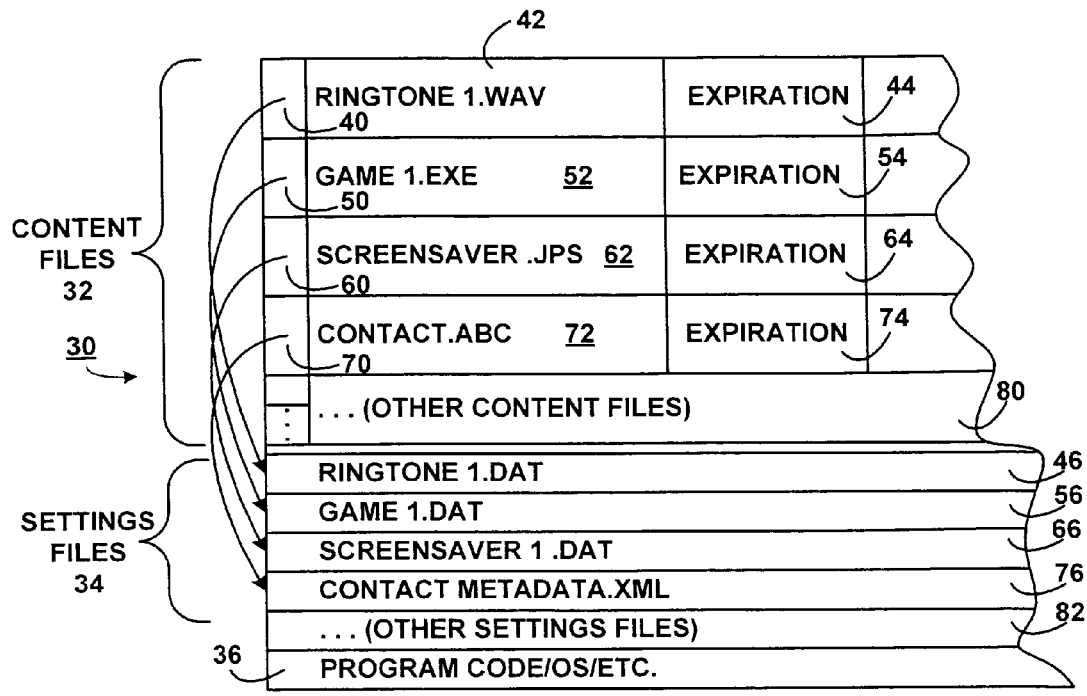
FIG. 2 is an illustration of a memory device present in the wireless device of FIG. 1 which stores content obtained from the content server of FIG. 1, as well as content settings. The memory of FIG. 2 and pointers between the content and the content settings is illustrated in somewhat simplified form to better and more clearly illustrate the concepts involved with the present disclosure.
Figure 4:
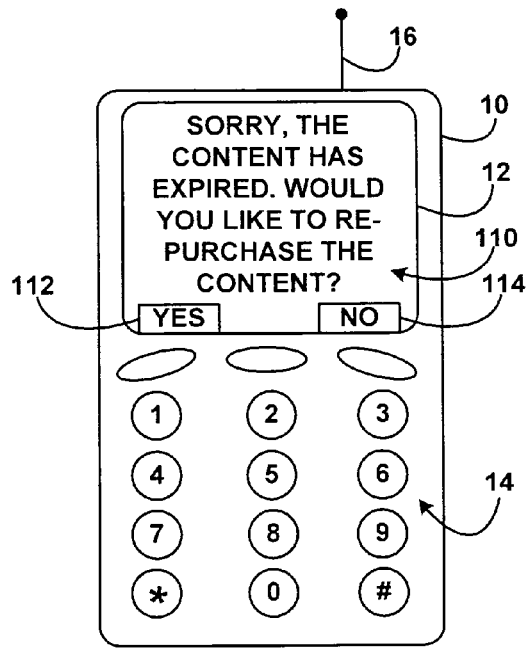
FIGS. 4, 5, 6 and 7 show examples of graphical user interface displays that may be presented to the user of the wireless device of FIG. 1 during the execution of the process of FIG. 3. The displays of FIGS. 4-7 are offered by way of example only and not limitation. The specifics of the displays may of course vary widely.

As persons skilled in the art will appreciate, the device 10 includes a main memory which stores media content files, such as ring tone files, game files, etc. The memory of the device of FIG. 1 is such that the content files are stored separately from the setting files. This arrangement is shown in FIG. 2. The memory 30 includes a first region 32 storing a plurality of content files and a second region 34 storing a plurality of setting files, generally one setting file per content file. Each content file includes a pointer to a location in memory where the settings file is stored. For example, the media content file 42 may be a ring tone .WAV file. A pointer 40 points to a memory location where a ring tone.DAT settings file 46 is stored, storing settings for the ring tone.WAV file 42. The ring tone file 42 may have an expiration field 44 which may include an expiration date, expiration duration, or other information indicating how long the ring tone file 42 is available to the user. The expiration field 44 may also include a bit or flag which indicates whether the file 42 has expired or not. The expiration date or duration in field 44 can be generated in any number of fashions, such as being dictated by the media content server when the content is delivered, by a content management application that manages media content as described herein, by a digital rights management module included in the .wav file 42, or in any other manner. When the content file 42 is deleted as described herein, the flag in the field 44 may be set to "expired" and the pointer 40 still points to the settings file for the deleted content file. If and when the content is reacquired, it can be stored in the content file field 42.

In FIG. 2, the content files 32 also include a game file 52, pointer 50 to memory location 56 where game settings are stored (game1.DAT), and an expiration field 54 including an expiration date and expiration status flag. The content files 32 may also include a screen saver file 62 (e.g., picture, video or other image file), a pointer 60 to a screensaver settings file 66 (screensaver1.DAT) and an expiration field 64. The content files may also include a contact file 72 which comprises a contact name in an address book, expiration field 74 and pointer 70 to a contact settings file 76 (contactmetadata.XML), which contains contact settings for the contact in contact file 72. Such settings in the XML file 76 may include metadata describing properties for the contact settings, such as properties of a ring tone, greeting, forwarding phone number, email address, etc. for the contact.

The memory 30 stores additional program code shown at 36, such as device operating system, and a media content management application (functions of which are described herein) which manages content and deletes content files 32 from memory while preserving settings files 34.

Figure 3:
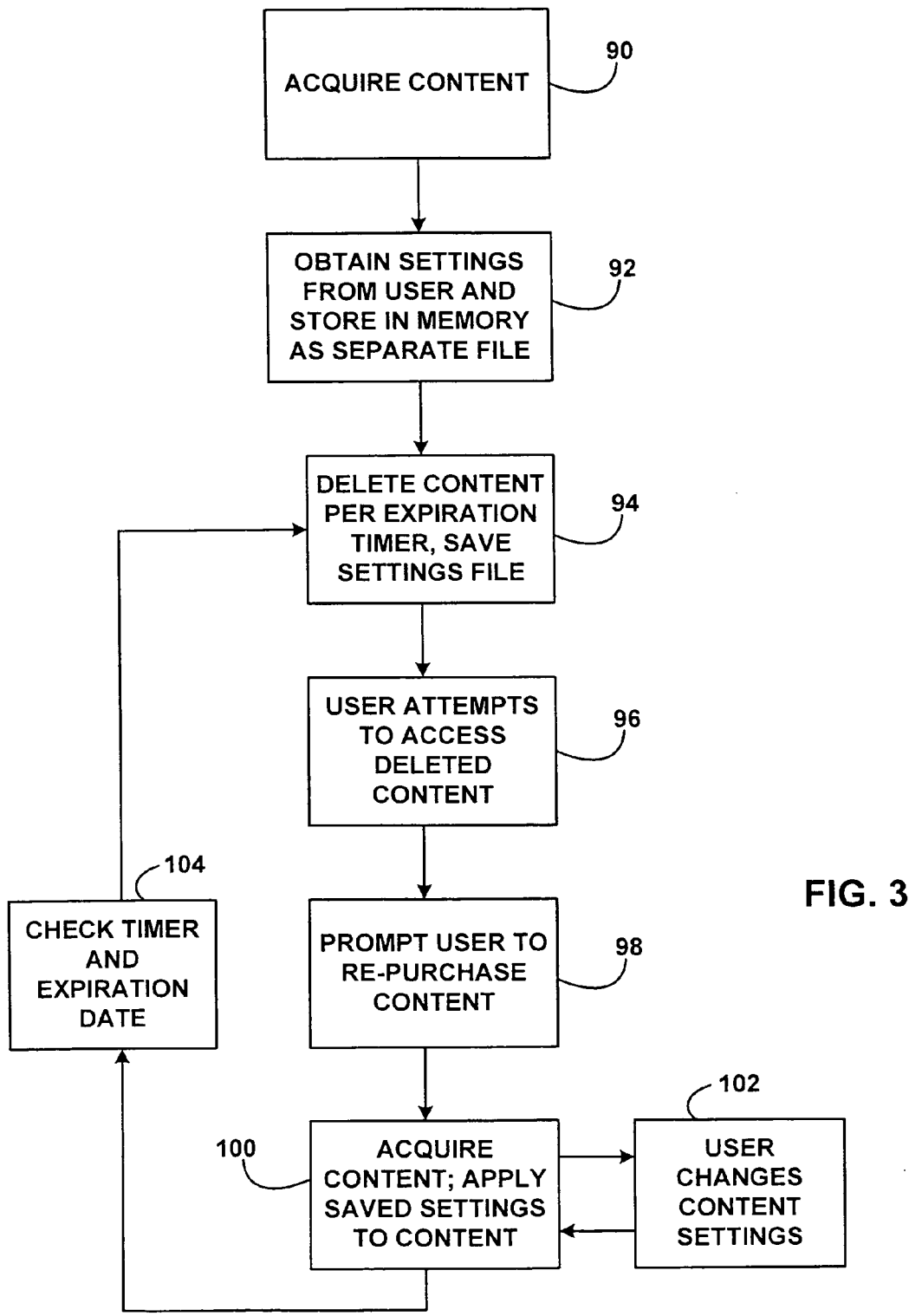
FIG. 3 is an illustration of a flow chart showing a media content management process or application which facilitates acquiring content, and later deleting the content upon expiration of a timer while saving the content settings, and optionally later re-acquiring the content and applying the saved settings when the content is reacquired.

FIG. 3 is an illustration of a process which explains further the functions of a media content management application resident in the memory 30 of the device 10 which facilitates obtaining deleting content files while saving settings files. The discussion of FIG. 3 will make references to the screen shots presented on the wireless device 10 shown in FIGS. 4-7.

Figure 5:
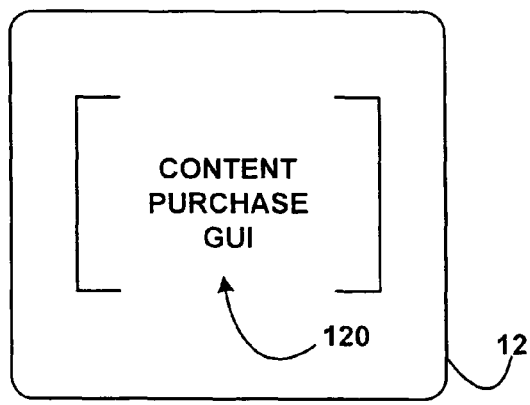

At step 90, a user acquires media content from the content server of FIG. 1 and the content is stored in the memory 30 (see FIG. 3, content files 32). As shown in FIG. 5, the user purchases content with appropriate prompts on the display 12, the details of which are not important and are indicated by reference 120. An expiration date for the content is determined and a timer is set in the expiration field for the content file. At step 92, the user invokes settings features for the content (e.g., assigns a ring tone to a particular caller) and the media content application stores the settings in memory in a separate settings file 34 (FIG. 2). In some situations the settings may also be determined by the underlying application itself in which case the media content management application obtains such settings from the application and stores them in the settings file for the content. The pointer from the media content file to the settings file is established.

At step 94, the content becomes expired as a result of the passage of time as dictated by the expiration field and the content file 32 is deleted from the memory 30. However, the settings file 34 is preserved. This action frees up valuable memory space in the memory but maintains settings in the event the content is reacquired.

Figure 6:

At step 96, the user later attempts to access the content (e.g., boot up the game, invoke the ring tone, apply the screensaver, etc.). At step 98, the media management application detects the presence of the expired flag and then prompts the user to repurchase or otherwise reacquire the content. In one embodiment, the user follows a prompt or series of prompts which connects the device 10 to the content server and the content is reacquired, the details or which are not important. If, at step 98, the user declines to reacquire the content, the settings file 34 is deleted. If the user repurchases the content, at step 100 the content is acquired from the network server and downloaded into the memory 30. One example of a screen display which may be presented after content is downloaded again is shown in FIG. 6. The display 12 displays a message indicating successful repurchase of the content and a message indicating the previously-stored settings are reapplied to the content. In particular, at step 100 the pointer field in the newly downloaded content file 32 is set to point to the previous-stored and saved settings file 34, thereby applying the settings to the newly reacquired content. As indicated at step 102, the user may change content settings by interacting with their device 10, in which event the settings in the setting file are changed.

As indicated at step 104, the media content management application periodically checks a timer and expiration dates for media content stored in memory 30 and if any content expires, the steps 94, 96, 98, 100 and 102 repeat.

Figure 7:
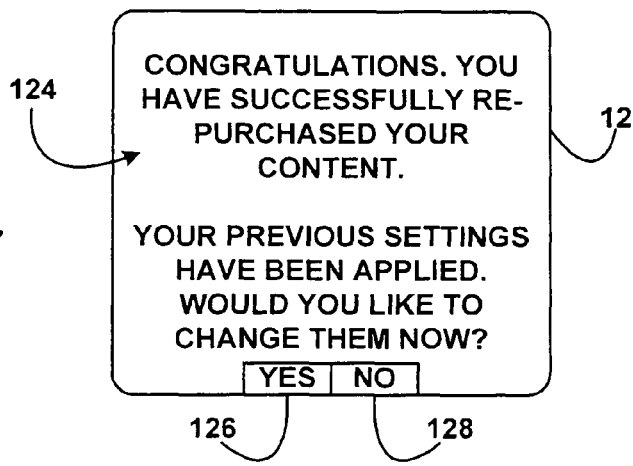

In one possible variation, when the user downloads content at step 100 of FIG. 3, the user is presented with a display such as shown in FIG. 7 and advised that the previously stored settings are applied but given the option to change them, as indicated in message 124. If the user activates the YES icon 126, the underlying media application is invoked and the user is presented with appropriate menus or displays to change settings for the content (e.g., ring tone, game, etc.). On the other hand, if the user activates the NO icon 128, the settings are maintained as-is.

Several additional examples of use of the invention include the following: (1) the wireless device is a cellular telephone, the media content file comprises a ring tone file, and the settings comprises an association between the ring tone and a contact maintained in a contacts list stored in the memory. (2) The wireless device comprises a personal digital assistant or cell phone, the media content file comprises a game file, and the settings comprise at least one of: player preferences for the game, game settings, and level of play obtained in the game. (3) The wireless device comprises a cellular telephone, the media content file comprises a screen saver file in the form of pictures or video, and wherein the settings comprise one or more settings for the screen saver file.

From the foregoing, it will be appreciated that we have disclosed an improvement to a wireless device storing a media content file 32 in memory 30 on the device, the improvement comprising: providing in the memory 30 a file 34 storing settings for the media content file separate from the media content file 32, wherein the media content file 32 may be deleted from the memory but the settings file 34 may be simultaneously preserved in the memory.

It will further be appreciated that we have described a media content management apparatus for a wireless device 10, comprising: a machine readable memory 30 storing program instructions (program code 36) for managing media content stored on the wireless device, wherein the program instructions comprise a routine deleting media content files 32 while simultaneously preserving settings files 34 for deleted media content files, as described above in conjunction with FIGS. 1-6.

While presently preferred and alternative embodiments have been described, variation from the illustrated embodiments is possible without departure from the scope of the invention. The scope is to be determined by reference to the appended claims.

We claim:

1. A method of managing ring tones stored in a wireless device, comprising the steps of:
    storing a ring tone in a memory in the wireless device in a content file;
    separately storing settings for the ring tone in the memory in a settings file, wherein the settings comprise an association between the ring tone and a contact maintained in a contact list stored in the memory;
    deleting the content file while simultaneously preserving storage of the settings file; and
    after deleting the content file, (i) re-acquiring the ring tone from a network content server and (ii) applying the preserved settings in the settings file to the reacquired ring tone.

2. The method of claim 1, wherein the content file is automatically deleted upon passage of an amount of time after the content file was initially stored in the wireless device.

3. The method of claim 1, wherein the content file includes a pointer to the settings file.

4. In a wireless device storing a ring tone file in memory on the device, the improvement comprising:
    providing in the memory (i) a settings file storing settings for the ring tone file separate from the ring tone file, wherein the settings comprise an association between the ring tone file and a contact maintained in a contact list stored in the memory and (ii) program instructions executable by a processor to delete the ring tone file from the memory while simultaneously preserving the settings file in the memory, wherein the wireless device further comprises an application providing for user selection of ring tone files, and wherein the application is configured such that, in the event that, after the ring tone file is deleted from the memory, the user attempts to select the ring tone file which has been deleted from memory, the application facilitates the user re-acquiring the ring tone from a network content server, wherein the program instructions are further executable to re-apply the settings in the settings file to the reacquired ring tone.

5. The improvement of claim 4, wherein the ring tone file is associated with an expiration timer and wherein the program instructions are further executable to delete the ring tone file automatically in accordance with the expiration timer.

6. The improvement of claim 4, wherein the ring tone file includes a pointer to the settings file.

7. A ring tone management apparatus for a wireless device, comprising:
    a machine readable memory storing program instructions for managing ring tones stored on the wireless device, wherein the program instructions comprise instructions for deleting a ring tone file while simultaneously preserving a settings file for the deleted ring tone file, wherein settings in the settings file comprise an association between the ring tone file and a contact maintained in a contact list stored in the memory,
    wherein the program instructions further comprise instructions for prompting the user of the wireless device to re-purchase the ring tone that has been deleted,
    wherein, in the event that, after the ring tone file is deleted, the user re-purchases the-ring tone, and
    wherein the program instructions further comprise instructions for associating the saved settings file with the re-purchased ring tone.

8. The media management apparatus of claim 7, wherein the program instructions delete the ring tone file in accordance with an expiration timer associated with the ring tone file.

* * * * *